Figure 19:
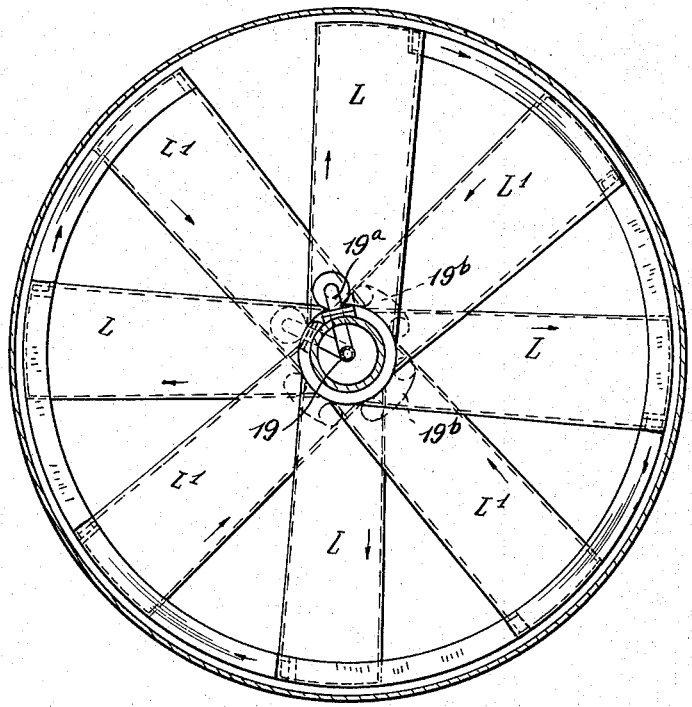

July 10, 1945.  H. H. FELDSTEIN  2,379,895
CRYSTALLIZING APPARATUS
Filed May 20, 1943  5 Sheets-Sheet 1
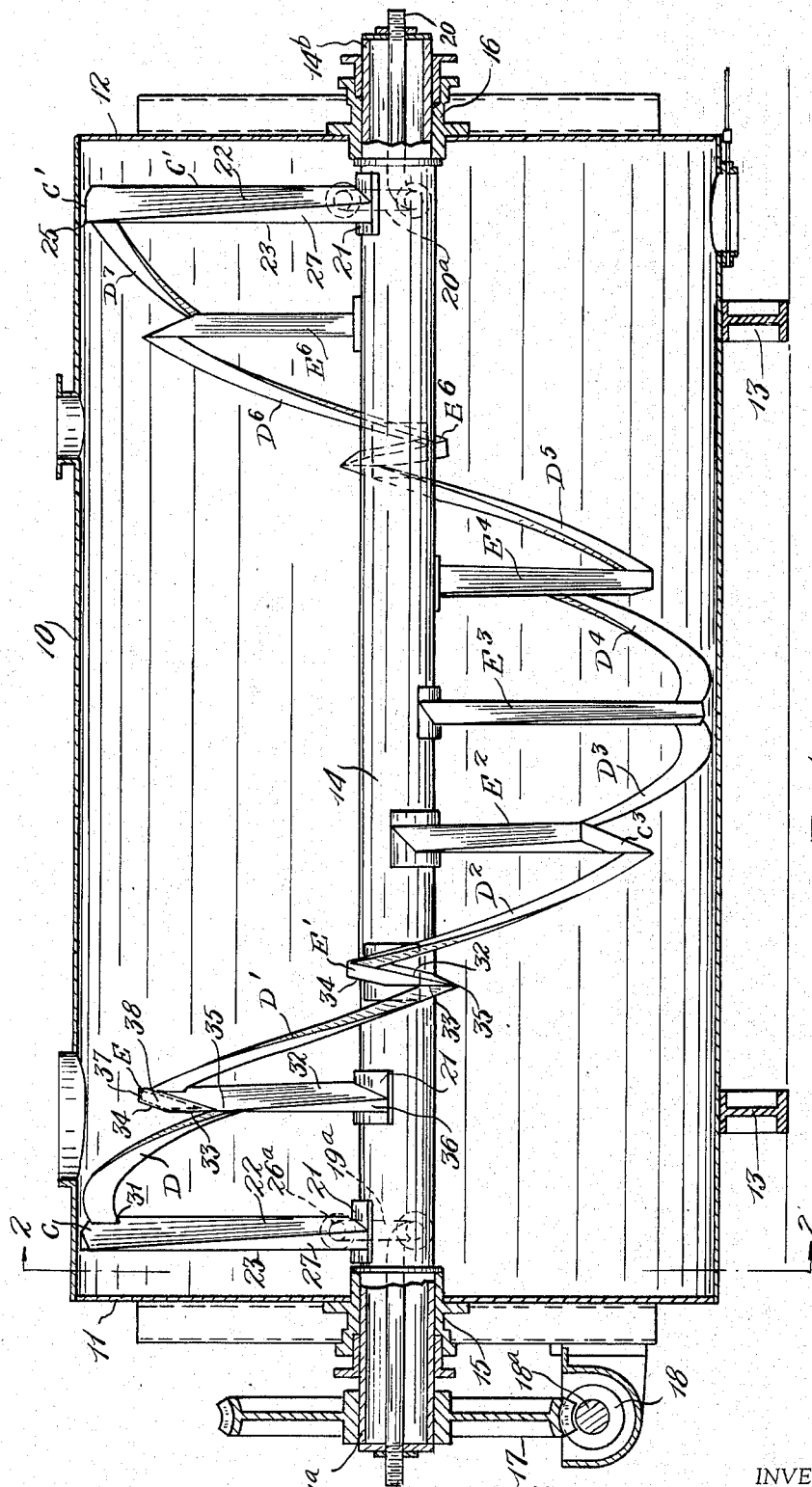
INVENTOR.
Henry H. Feldstein,
BY Hull & West
ATTORNEYS July 10, 1945.    H. H. FELDSTEIN    2,379,895
CRYSTALLIZING APPARATUS
Filed May 20, 1943    5 Sheets-Sheet 2
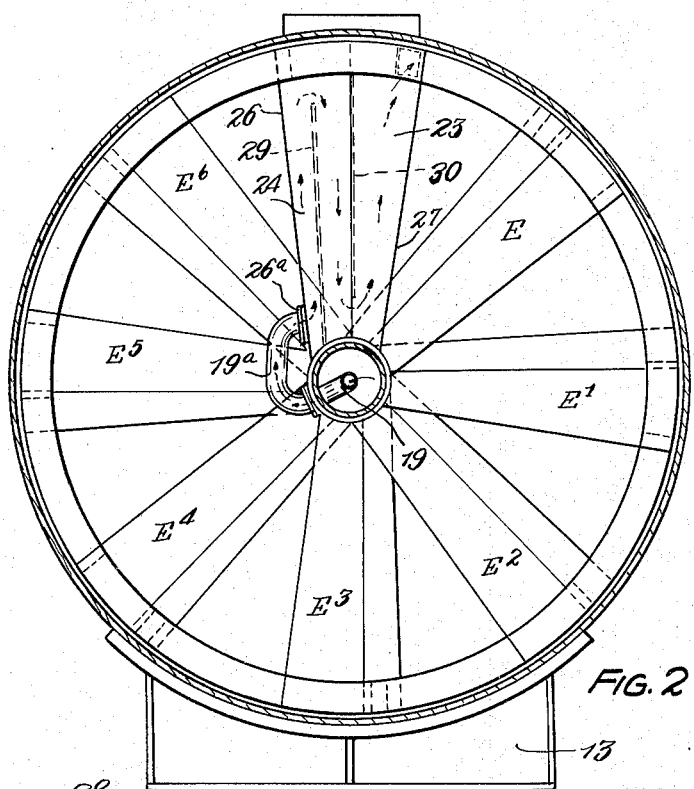
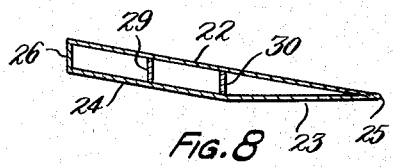
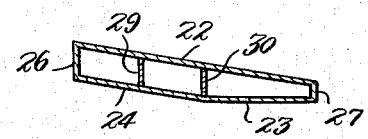
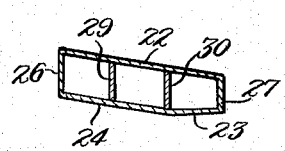
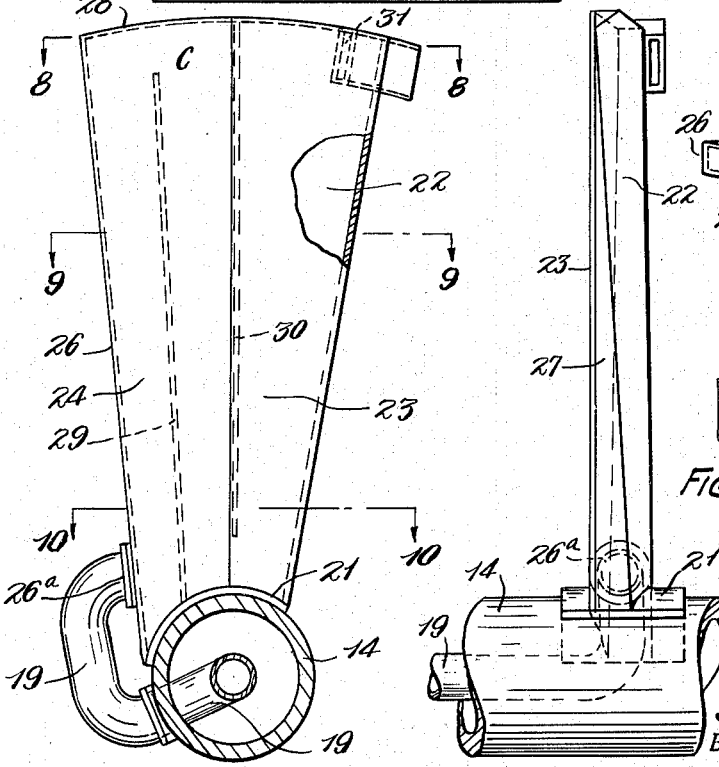
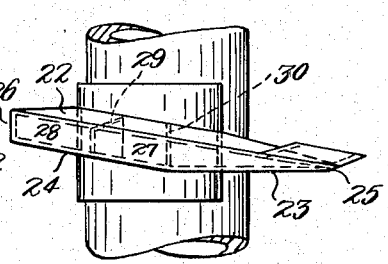
INVENTOR.
Henry H. Feldstein,
BY
ATTORNEYS July 10, 1945. H. H. FELDSTEIN 2,379,895
CRYSTALLIZING APPARATUS
Filed May 20, 1943 5 Sheets-Sheet 3

INVENTOR.
Henry H. Feldstein
BY
Hull & West
ATTORNEYS

July 10, 1945.   H. H. FELDSTEIN   2,379,895
CRYSTALLIZING APPARATUS
Filed May 20, 1943   5 Sheets-Sheet 5

INVENTOR.
Henry H. Feldstein,
BY
ATTORNEYS

Patented July 10, 1945

2,379,895

UNITED STATES PATENT OFFICE 2,379,895

CRYSTALLIZING APPARATUS

Henry H. Feldstein, Cleveland, Ohio

Application May 20, 1943, Serial No. 487,694

19 Claims. (Cl. 127—15)

This invention relates to apparatus for effecting the crystallization of sugar from massecuite, and has for its general objects to increase the efficiency of such apparatus and also to effect a substantial reduction in the amount of metal employed in constructing the heat-interchanging and stirring elements of such apparatus.

As is well known to those versed in this art, crystallizing apparatus in general use by the industries manufacturing beet, cane, and corn sugar, consists of an external shell, which is of cylindrical or U-shape, within which there is mounted a rotating shaft which carries stirring elements only, or heat-interchanging elements only, or both types of elements. The motion imparted to these elements is basically a rotary motion but, in order to accomplish efficient crystallization, this rotary motion must also induce relative motion between sugar crystals contained in the massecuite which is a mixture of sugar crystals and mother liquid carrying sugar in solution and the massecuite itself, relative motion between the massecuite and the metallic surfaces of the heat interchanging elements, also relative motion between all parts of the massecuite in order to prevent stratification. While an apparatus capable of inducing a movement of the massecuite in all directions would tend to produce all of the foregoing relative motions, it does not follow that the results of these motions would be satisfactory or efficient unless a sufficient amount of properly distributed heat-interchanging surface is provided. The movement of the massecuite in all directions must be necessarily slow, in order to enable the sugar (which supersaturates the massecuite as the cooling of the latter proceeds) to be deposited on the faces of sugar crystals that have already been formed. Furthermore, on the one hand the total amount of metal parts inside the crystallizer shell must be kept at a minimum so as to reduce as far as possible the drag of the metal surfaces upon the viscous, heavy massecuite, since this drag results in the over-production of the basic rotary motion with a corresponding under-production of the induced relative motions referred to above; on the other hand, the stirring and heat-interchanging elements must be present in such total amount as to be capable of effecting the induced motions and the heat transfer set forth hereinbefore.

Figure 7:
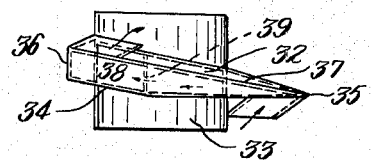
Figure 4:
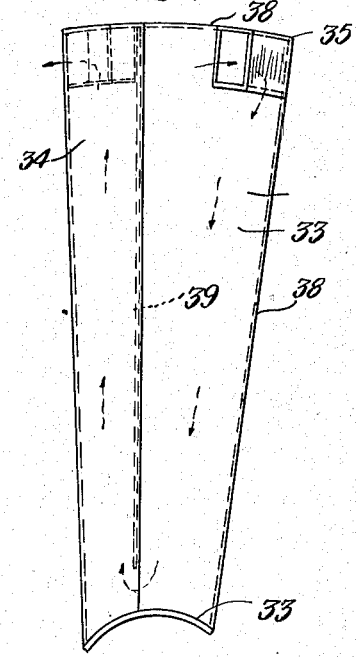
Figure 22:
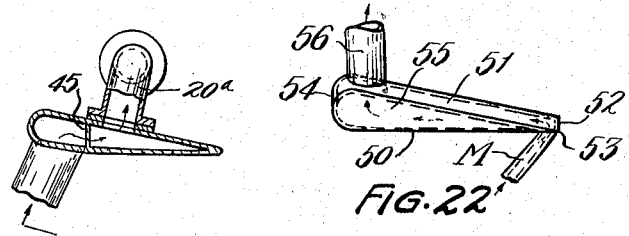
Figure 17:
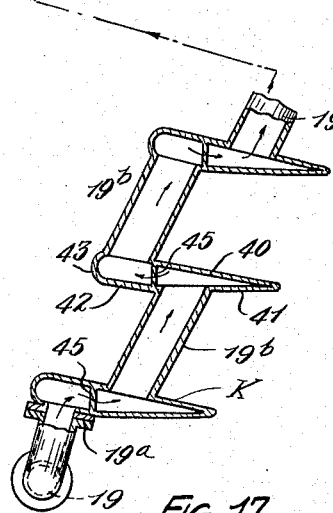
Figure 16:
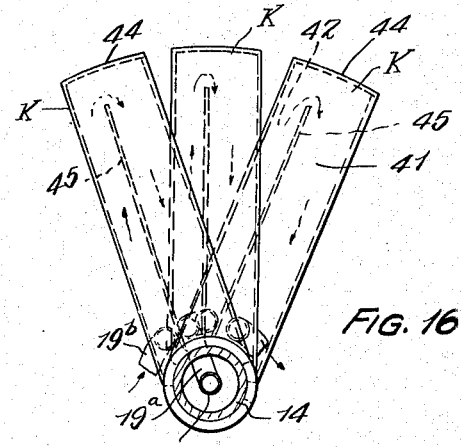
Figure 15:
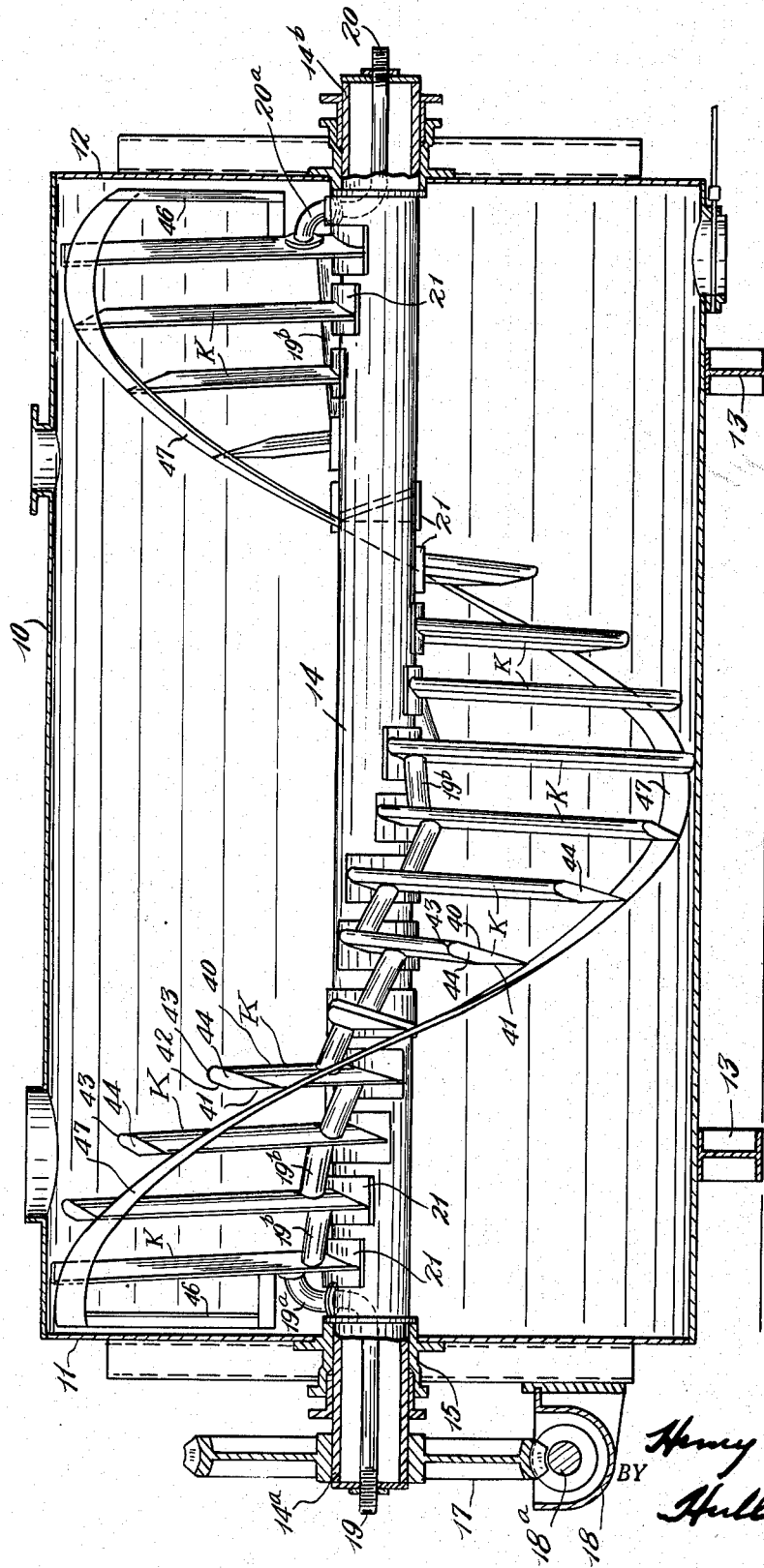
Figures 18, 20, 21:
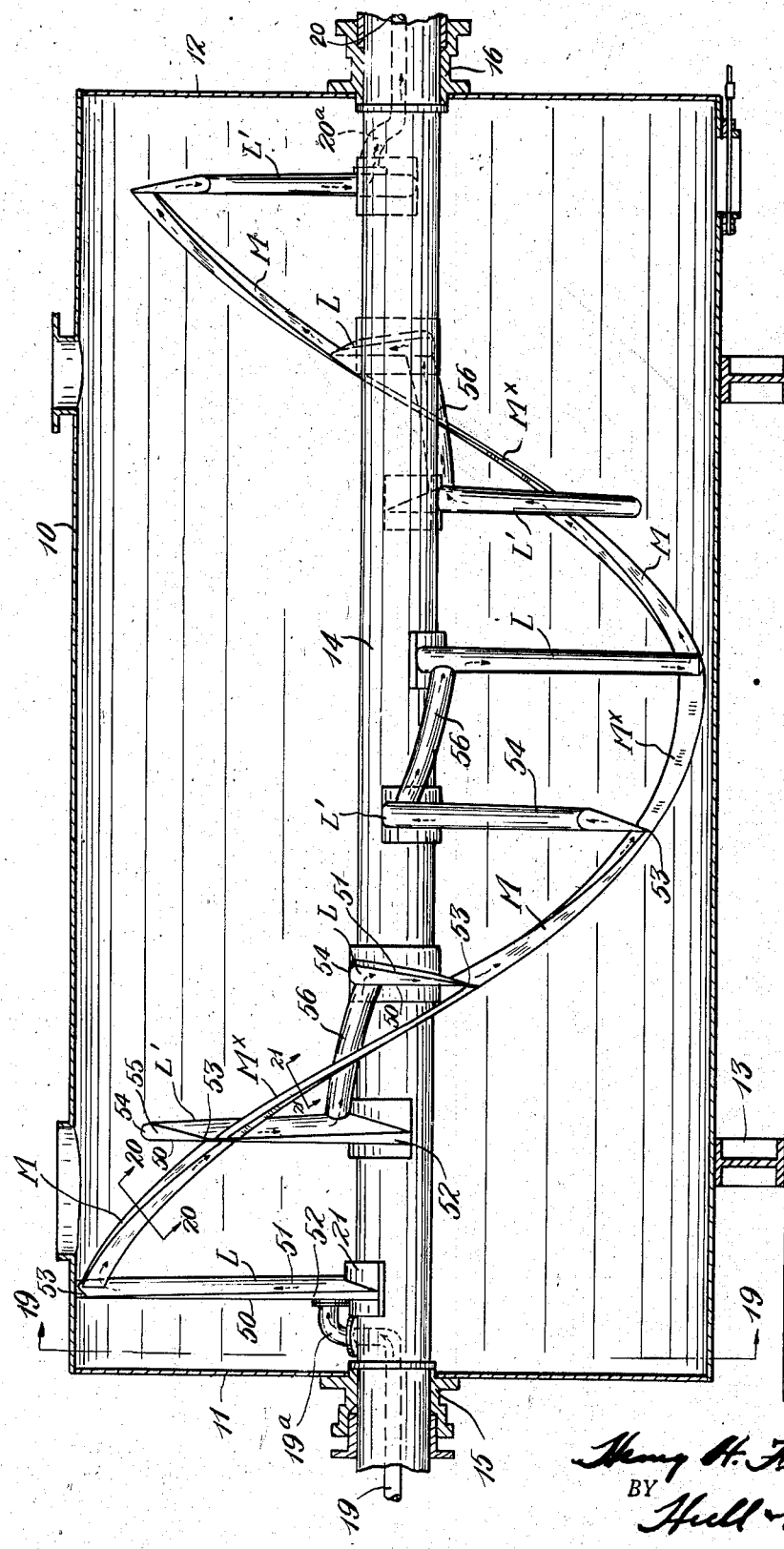

The heat-interchanging elements which I employ will, by their combined stirring and heat-interchanging functions, reduce to a minimum the amount of metal parts within the tank and will be capable of accomplishing all of the operations which are necessary for the most effective crystallization of massecuite, as will be pointed out hereinafter in connection with the drawings hereof, wherein Fig. 1 represents a central longitudinal sectional view through a crystallizing tank having therein combined stirring and heat-interchanging elements constructed in accordance with my invention, the shaft and the said elements being shown in elevation; Fig. 2 a sectional view taken on the line 2—2 of Fig. 1; Fig. 3 a side elevational view of one of the end heat-interchanging elements (the shaft being shown in section) and Fig. 4 a similar view of one of the intermediate heat-interchanging elements, both of said elements being embodied in the apparatus shown in Fig. 1; Fig. 5 an edge elevational view of the element shown in Fig. 3 and Fig. 6 a top plan view of the said element, the connection for the inlet pipe being omitted, and Fig. 7 a view similar to Fig. 6 of the element shown in Fig. 4; Figs. 8, 9 and 10 are details in section taken on the correspondingly numbered lines of Fig. 3; Fig. 11 a sectional view through the stirring element or scroll shown in Fig. 1 and Figs. 12, 13 and 14 are views similar to Fig. 11 showing modified forms of the said scroll; Fig. 15 is a view, similar to Fig. 1, of a modified form of my invention; Fig. 16 a detail in sectional elevation of the shaft and several of the heat-interchanging elements shown in Fig. 15; Fig. 17 a diagrammatic sectional view showing the manner in which the liquid is circulated through the heat-interchanging elements shown in Fig. 15; Fig. 18 a view similar to Fig. 1 of a still further modification of my invention; Fig. 19 a sectional view corresponding to the line 19—19 of Fig. 18; Figs. 20 and 21 details in section taken on the lines 20—20 and 21—21, respectively, of Fig. 18; and Fig. 22 a plan view of one of the heat-interchanging elements in the apparatus shown in Fig. 18.

Describing by reference characters the parts shown in the drawings, and first with reference to Figs. 1 to 13 of the drawings, 10 denotes a familiar type of cylindrical crystallizer tank having its ends closed by heads 11 and 12, the tank being shown as supported by cradles 13. 14 denotes a shaft extending longitudinally and centrally through the tank and having its opposite ends mounted in journals 15 and 16 carried by the heads 11 and 12, respectively. One end of the shaft has a worm gear 17 secured thereto, the said gear being driven by a worm 18 on a worm shaft 18ª. The body of the shaft is preferably hollow for the convenient reception of the centrally arranged inlet pipe 19 and outlet pipe 20, respectively.

A plurality of heat-interchanging elements are secured to the shaft and project substantially radially therefrom. These elements are so constructed as to enable me to obtain the various relative motions referred to hereinbefore, with the employment of a minimum amount of metal in the said elements. The construction and the manner of mounting and supporting the elements whereby I obtain this result will now be described.

Adjacent to the heads 11 and 12 are paddle-like heat-interchanging elements designated, respectively, C, C', which are identical in construction, each of the said elements being secured to the shaft by means of an anchoring base 21. For convenience of description, the sides of all of the paddle-like heat-interchanging elements herein which are presented toward the head 11 will be designated as the front sides and the opposite sides as the rear sides, while the edges of the elements which exert a thrust against the massecuite while the shaft is rotating will be designated as the front edges thereof. Referring to the detailed drawings, it will be seen that each element C, C' has the rear liquid impelling wall 22 thereof extending continuously from the base 21 and increasing in width radially outwardly from said base. It also has a front composite face comprising two walls 23 and 24 which also extend radially outwardly from the said base and increase radially outwardly in width, the wall 22 being inclined with respect to the wall 23, the two walls uniting at their radially outer ends to provide there a common sharp V-shaped corner edge 25 opposite the wall 26, which extends outwardly from the base 21. 27 denotes a wall which is opposed to the wall 26 and which extends radially outwardly from the base, being triangular in shape and gradually narrowing outwardly in width until eliminated at its outer end by reason of the convergence of the wall 23 toward the wall 22. The wall 24 also converges outwardly toward the wall 22, as will be apparent from an inspection of Figs. 8, 9 and 10 and the outer ends of the foregoing walls 22, 23, 24 and 26 are united to the end wall 28.

29 denotes a baffle extending radially outwardly from the base 21, between the walls 22 and 24, to a point spaced from the end wall 28; 30 denotes a similar baffle which extends radially inwardly from the wall 28 toward the base 21, being spaced therefrom. The baffles are so positioned with respect to the walls 26 and 27 and their ends are so spaced from the wall 28 and the base 21, respectively, as to provide a passageway of substantially unvarying cross sectional area for the liquid passing through the element C. The liquid is supplied to the passageway between the wall 26 and the baffle 29 by means of an extension 19ª of the pipe 19 and a connection 26ª for said extension, said connecting being located closely adjacent to the base 21. The outer end of the passageway provided between the baffle 30 and the wall 22 is provided with an outlet connection 31 communicating with one section D of a hollow combined stirrer and scraper.

It will be seen that, while the element C and the wall 23 thereof project radially outwardly from the shaft 14, the walls 22 and 24 are so inclined with respect to the wall 23 that, through rotation of the shaft in the appropriate direction, the element C as a whole will exercise a paddle-like effect upon the massecuite, the resistance opposed to such rotation by the massecuite and by the amount of movement imparted to the same being substantially constant for every cross-section through the element irrespective of the distance of the same from the axis of the shaft, due to the progressive radially outward divergence of the walls 26 and 27. Furthermore, the inclination of the walls 22 and 24 serves also to impart, through the rotation of the element C, a radially outward movement to the massecuite as well as a movement of the same longitudinally with respect to the tank. Still further, the shape of the element C will also cause an agitation of the massecuite in every portion of the massecuite through which the said element passes in its rotation. In short, due to the shape of the element C, its rotation will induce all of the relative motions in the massecuite to which reference has been made hereinbefore.

The liquid supplied to the element C passes through the outlet connection 31 into one end of the first section of the combined conduit and scroll D. The opposite end of this conduit section in turn communicates with the radially outer end of the adjacent intermediate element E, shown more in detail in Figs. 4 and 7. Each of the elements E—E⁶ is of substantially the same shape as the element C, increasing in width radially outwardly from the shaft to which it is secured by means of a base plate 21, preferably identical in construction with the base plate for the element C. Each of the elements E—E⁶ comprises a wall 33, similar to the wall 23 of the element C and extending radially outwardly at right angles to the axis of the shaft and increasing in width from the base 21 outwardly. Each element E—E⁶ also includes a wall 32 similar to the wall 22, and united at its outer end with the wall 33 at the point 35. It is also provided with a wall 34, similar to the wall 24. In addition, each element E—E⁶ comprises opposed walls 36 and 37, similar to the walls 26 and 27, respectively, of the element C. The outer ends of these walls are all provided with a common end wall 38.

The space within each element E—E⁶ is divided by a baffle 39 into communicating conduit sections. This baffle extends radially inwardly from the wall 38 to a point spaced from the base plate 21 and is so arranged with respect to the walls 36 and 37 as to provide within each element E—E⁶ a conduit section which is of substantially the same cross-sectional area throughout the said element. It will be noted that the scroll section D is connected to the forward edge of the element E, adjacent to the corner 35, and that the next scroll section D¹ is connected to the rear edge portion of the said element, adjacent to the cover 38, whereby the liquid, after having passed through the element C, is conducted to the element E, wherein it is given a reverse circulation by means of the baffle 39 and is delivered into the scroll section D' whence it is circulated through the next intermediate section E'. Each of these intermediate sections E—E⁶ is constructed in the same manner as the one just described and the liquid is supplied from one to another in series by the scroll sections D'—D⁶. No further detailed description of any of these intermediate sections will be necessary at this time, it being noted that the liquid delivered from the last of these sections E⁶, is conducted by the corresponding scroll section D⁷ into the final element C', which is constructed in identically the same manner as the first element C, although the liquid is circulated therethrough in a manner the reverse of that in which it is circulated through the first element. This is due to the fact that the liquid enters the outer end of the element C', adjacent to the corner 25, and is circulated radially inwardly, thence radially outwardly and finally radially inwardly, being discharged into the outlet pipe 20 by the branch 20ᵃ of said pipe, which branch communicates with the bottom of the final passageway formed within the said element. The scroll sections D—D⁷ may each be rectangular in section, as shown in Fig. 11; or they may be tubular, as shown at G in Fig. 12, in which case a plane impelling element G' will be welded or otherwise suitably secured to each of the tubular portions; or they may be triangular in section, as shown at H in Fig. 13; or elliptical, as shown at J in Fig. 14; or they may be of any other section having a flat surface for moving the massecuite. The purpose of imparting such shapes to the scroll is to enable the same, when passing through the massecuite, to exercise or create an agitation in and around the scroll in addition to the movement which the scroll as an entity imparts to the massecuite.

With the parts constructed and arranged as described, it will be evident that by rotation of the shaft 14 and the consequent rotary movement imparted to the various parts attached thereto, this rotary movement will result in inducing the relative motions referred to hereinbefore whereby a most effective separation of the sugar in solution of the massecuite will be effected. Stratification, which would necessarily interfere with such efficient separation, is entirely avoided by the construction shown and described, as no basket effect is produced; and the total amount of metallic parts employed in accomplishing the results is greatly reduced as compared with the corresponding parts employed in standard installations with which I am familiar.

In Figs. 15-17, inclusive, there is shown a modification of my invention wherein the same reference characters that are employed in the preceding modification are applied to like parts which appear herein.

Within the tank 10 are the heat-interchanging elements K, each of which is secured to the shaft by means of a base plate 21. Each of these elements is so mounted on its base plate 21 that, when the latter is secured to the shaft, the said elements are inclined radially outwardly toward the head 11 of the tank. Each of the elements is preferably of the same depth from its forward edge to its rear edge throughout its length, but is generally wedge-shaped in section, each comprising an inclined front wall 40 extending the full depth of the element, a wall 41 forming an acute angle with the forward edge of the wall 40, and a wall 42 forming an obtuse angle with the wall 41, the walls 40 and 42 being united by an outwardly convex wall 43 constituting the gear edge of the element. The walls 40, 41, 42 and 43 are provided with a cover plate 44.

Each of the elements is provided with a baffle 45 extending entirely thereacross and also extending radially outwardly from the base thereof to a point spaced from the cover plate 44, the baffle being so arranged with reference to the front and rear edges of each element and to the walls between which it is inserted as to provide a passageway through the element of substantially constant cross sectional area.

The bottom of the rear portion of the element K which is nearest to the head 11 receives liquid from the inlet pipe 19 through the branch 19ᵃ. The liquid supplied to this portion of the element circulates radially outwardly, around the end of the baffle 45 and thence inwardly to the outlet adjacent to the front lower edge of the element, where it is connected by means of a pipe section 19ᵇ with the bottom of the front edge portion of the next element, the liquid being circulated outwardly around the baffle 45 and thence inwardly to the rear portion of the said element, being conducted by the pipe section 19ᵇ to the inner rear portion of the third element K, wherein the liquid will be circulated in the same manner as in the first of said elements.

The liquid will be circulated through the succeeding pairs of elements K in the same manner as in the first pair, the final element being connected with the outlet pipe 20 by means of the branch 20ᵃ.

46 denotes extension brackets which may be conveniently supported by being secured to the first and last heat-interchanging elements. Each of these brackets supports one end of a scroll 47, the intermediate portions of the scroll being secured to the front edges of the outer ends of the elements K.

With the parts constructed and arranged as described, it will be seen that, by rotation of the shaft 14, the elements K, as they pass through the massecuite, will create an agitation in the same and will also impart to the massecuite movement outwardly toward the cylindrical wall of the tank, as well as longitudinally of the latter. The scroll cooperates with these elements in creating agitation in the massecuite as well as in imparting movement to the same both outwardly toward the cylindrical wall of the tank as well as longitudinally of the latter.

It will be noted that, due to the construction shown in Figs. 15-17, I am able to obtain a very efficient separation of the sugar from the massecuite through the induced motions referred to hereinbefore and that I am able to accomplish these results without the production of stratification in the massecuite.

In Figs. 18-22, I have shown a further modification of my invention wherein the same reference characters that are employed in the preceding modifications are applied to like parts which appear herein. In these views, the heat interchanging elements are similar in general appearance to the elements E—E⁶ of Fig. 1 but are arranged in pairs, the elements of each pair being designated generally as L and L', respectively. Each element is provided with a plane wall 50 extending radially outwardly from the base 21 and forming preferably a right angle with the axis of the shaft; it is also provided with a wall 51 which extends outwardly from the base 21 and is inclined radially outwardly toward the wall 50 and which also forms an oblique angle with the axis of the shaft. The inclination of the wall 51 with reference to the wall 50 is such that these walls unite at a common point at their extreme outer ends. 52 denotes a wall which extends upwardly from the base 21 between the walls 50 and 51, the width of the wall 52 gradually diminishing outwardly until it merges at its extreme end with the junction of the walls 50 and 51 at the point 53. The rear edges of the walls 50 and 51 are connected by an outwardly convex wall 54 and the ends of these walls are provided with a cover wall 55.

It will be noted, by reference to Fig. 19, that the heat interchanging elements L and L' increase gradually in width from their bases 21 outwardly toward the wall 10 of the tank, this increasing width compensating for the decrease in fore-and-aft thickness of the passageway for liquid provided within the walls of each element whereby the passageway will be of substantially uniform cross sectional area throughout the extent of each element. The outer end of the element L is connected to the outer end of the adjacent element L' by means of a tubular scroll section M, the cross sectional area of which is substantially equal to the cross sectional area of the passageway provided through the elements L and L'. In this embodiment of my invention, no baffles are provided within the heat interchanging elements, whereby each will provide only a single pass for the liquid flowing therethrough.

Liquid is supplied to the inner portion of the element L which is adjacent to the head 11 through the branch 19ª of the inlet pipe 19. The liquid then circulates radially outwardly in said element to the top thereof whence it is delivered by the scroll section M into the top of the adjacent element L'. The liquid from the bottom of the element L' of the first pair of heat-interchanging elements is conducted by a pipe 56 into the bottom of the element L of the second pair of heat-interchanging elements, it being noted that the outer ends of the last two elements are connected by a solid scroll section M$^x$.

The outer end of the element L of the second pair of elements is connected with its companion element L' by means of a hollow scroll section M, and so on, the circulation of the liquid throughout the elements being from the inner end to the outer end of the first element L, thence through the hollow scroll section M into the outer end of the second element L' and thence through pipe 56 into the inner end of the third element L, thence from the outer end of the third element L and hollow scroll section M into the outer end of the fourth element L', thence from the inner end of the fourth element L' through pipe 56 into the inner end of the fifth element L, thence through hollow scroll section M into the outer end of the sixth element L'; thence from the inner end of the sixth element L' through pipe 56 into the inner end of the seventh element L; and thence through hollow scroll section M into the outer end of the last element L, and from the inner end of the last element into the outlet section 20ª of the outlet pipe 20.

It will be noted that solid scroll sections M$^x$ are employed to connect the tops of the elements the bottoms of which are connected by the pipes 56.

When the parts are constructed and arranged as described, it is believed that the operation will be readily understood. The shaft 14 having been rotated in the appropriate direction, the elements L and L', through the rotary movement imparted thereto, create not only an agitation in the portions of the massecuite through which they pass but they also impart a movement outwardly toward the wall of the tank 10 as well as longitudinally of said tank, and the scroll also operates not only to create agitation in the portions of the massecuite through which it is passing, but also to impart movement of the massecuite outwardly toward the wall 10 of the tank, as well as longitudinally thereof. In short, the rotary movement of the shaft and the elements thereon will induce all of the relative motions which it is the object of my invention to secure and the advantages of which have been pointed out hereinbefore.

In all three forms of apparatus shown and described herein, there is embodied the use of paddle-like heat-interchanging elements, the walls of which are so shaped and so arranged with reference to the shaft and the wall of the tank as to obtain a most efficient heat interchange between the elements and the massecuite; while, in all forms of my invention, a passageway of substantially uniform cross sectional area is provided for the liquid from its inlet into the apparatus up to and including the outlet therefrom.

In the foregoing description, the edge portion of each heat-interchanging element which is formed between convergent walls is referred to as the "front" portion or edge of the said element while the opposite portion is referred to as the "rear" edge or portion, and similar use is made of these terms in some of the claims appended hereto without any intention thereby to limit my invention in respect to the particular direction in which the elements may be circulated through the liquid in the tank.

In all forms of my invention there is a radial flow of the liquid in its circulation through the heat-interchanging elements, and in all forms of my invention this flow is radially outward in at least alternating elements. This radial flow tends to equalize the temperature imparted to all cross sectional areas of the massecuite intercepted by the rotation of said elements.

Having thus described my invention, what I claim is:

1. A crystallizer apparatus comprising, in combination, a tank, a shaft extending longitudinally of and within said tank and means for rotating said shaft, a series of hollow heat interchanging elements secured to the said shaft and longitudinally and angularly spaced with relation to one another, each of said elements comprising a substantially plane wall extending radially outwardly from the shaft, a second wall also extending radially outwardly from the said shaft and united at one edge thereof to the front edge of the former wall, a third wall united at its front edge to the opposite edge of the second wall and extending outwardly from the shaft in a direction inclined toward the first mentioned wall each of the said elements being provided with an inlet and an outlet connection for circulating liquid therethrough.

2. In the apparatus set forth in claim 1, each heat interchanging element also having a front wall united to the front edges of the first and third walls, the first, third and front walls meeting at a common point at the outer end of the element and the outer end of the element being provided with a covering wall for all of the other walls thereof.

3. In the apparatus set forth in claim 1, a scroll connecting the outer ends of all of said elements with its outer edge in proximity to the inner wall of the tank.

4. In the crystallizer apparatus set forth in claim 1, a hollow scroll section connecting the outlet connection of each element in the series with the inlet connection of the element immediately succeeding the same in the said series, the said inlet and outlet connections being located at the outer ends of the said elements and the outer edges of the scroll sections being located in proximity to the inner wall of the tank.

5. A crystallizer apparatus comprising, in combination, a tank, a shaft extending longitudinally of and within said tank and means for rotating said shaft, a series of hollow heat interchanging elements secured to the said shaft and longitudinally and angularly spaced with relation to one another, each of said elements comprising a substantially plane wall extending radially outwardly from the shaft, a second wall also extending radially outwardly from the said shaft and united at one edge thereof to the front edge of the former wall, a third wall united at its front edge to the opposite edge of the second wall and extending radially outwardly from the shaft and converging radially outwardly toward the first mentioned wall as well as converging from the rear to the front thereof toward the first mentioned wall, each heat interchanging element also having a front wall united to the front edges of the first and third walls, the first, third and front walls meeting at a common point at the outer end of the element, the outer end of the element being provided with a covering wall for all of the other walls thereof, and a scroll connected to the outer ends of the said elements with its outer edge in proximity to the inner wall of the tank, and each of said elements being provided with connections for circulating liquid therethrough.

6. A crystallizer apparatus comprising, in combination, a tank, a shaft extending longitudinally of and within said tank and means for rotating said shaft, a series of hollow heat interchanging elements comprising a first receiving end element and a final discharging end element and intermediate elements, all of said elements being secured to the said shaft and longitudinally and angularly spaced with relation to one another, each of said elements comprising a plane wall extending radially outwardly from the shaft, a second wall also extending radially outwardly from the said shaft and united at one edge thereof to the front edge of the former wall, a third wall extending from the shaft and united at its front edge to the opposite edge of the second wall and extending outwardly from the shaft in a direction inclined toward the first mentioned wall and also converging at its front edge toward the front of the first mentioned wall, each heat interchanging element also having a front wall united to the front edges of the first and third walls, the first, third and front walls meeting at a common point at the outer end of the element, the outer end of the element being provided with a covering wall for all of the other walls thereof, the elements intermediate of the end elements being provided each with a baffle extending radially inwardly from the top thereof and provided each with inlet and outlet connections located on opposite sides of said baffle and adjacent to the top of such element, the first end element of the series being provided with an inlet connection and with an outlet connection adjacent to the top thereof and the final end element being provided with an inlet connection adjacent to the top thereof and with an outlet connection adjacent to the lower portion thereof, and a scroll comprising hollow conduit sections connecting the outlet connection of each element in the series with the inlet connection of the next adjacent element in said series.

7. In the apparatus recited in claim 6, the inlet connection for the first heat interchanging element in the series being located adjacent to one edge and near the bottom thereof, for supplying liquid thereto and being provided with baffles whereby the liquid is caused to flow radially outwardly, inwardly and then outwardly to the opposite outer edge portion of the said element, one of the scroll sections connecting the outer end of the final passageway in said first heat-interchanging element with the outer end of the adjacent intermediate heat-interchanging element, and the final scroll section connecting the final intermediate heat-interchanging element with the outer end of the final heat-interchanging element, and the final heat interchanging element being provided with baffles whereby the liquid delivered into the outer portion thereof is caused to circulate radially inwardly, outwardly, and inwardly and thence into the outlet connection provided therefor.

8. A crystallizer apparatus comprising, in combination, a tank having heads and a cylindrical wall connecting said heads, a shaft extending longitudinally of and within said tank and means for rotating said shaft, a series of hollow heat-interchanging elements secured to the said shaft and longitudinally and angularly spaced with relation to one another, each of said elements extending radially outwardly from the said shaft and being inclined toward one of the heads of said tank, and each of said elements also comprising a substantially plane wall extending transversely of the axis of said shaft, a rear wall with which the rear edge of the said first wall is connected, and a wall connected to the opposite edge of said rear wall and extending from the rear wall and having its front edge united with the front edge of the first mentioned wall, each of said elements being provided with inlet and outlet connections whereby liquid may be circulated therethrough, a baffle extending between the first and third walls and spaced from the rear wall of each of said elements, each baffle extending from one end of its element toward but spaced from the opposite end thereof and each element having an inlet connection and an outlet connection arranged on opposite sides of the baffle therein and located adjacent to the end thereof from which the baffle therein extends, and conduit means connecting the outlet connection of each element with the inlet connection of the element next adjacent thereto in said series.

9. A crystallizer apparatus comprising, in combination, a tank, a shaft extending longitudinally of and within said tank and means for rotating said shaft, a series of hollow heat interchanging elements secured to the said shaft and longitudinally and angularly spaced with relation to one another, each of said elements comprising a substantially plane wall extending radially outwardly from the shaft, a second wall also extending radially outwardly from the said shaft and united at one edge thereof to the front edge of the former wall, a third wall united at its second edge to the opposite edge of the rear wall and extending outwardly from the shaft in a direction inclined toward the first mentioned wall and also converging at its front edge toward the front of the first mentioned wall, and means for circulating liquid consecutively through the elements of said series from the element at one end of the series to and including the element at the opposite end thereof, the said means for circulating liquid consecutively through the elements of said series including hollow scroll sections connecting the outer end portions of adjacent heat interchanging elements, the outer edges of the scroll sections being located in proximity to the inner wall of the tank, and a connection for supplying liquid to the first element of the series and a connection for delivering liquid from the last element in said series.

10. In the crystallizer apparatus recited in claim 9, the means for circulating liquid consecutively through the elements of said series comprising a conduit including the said elements, the hollow scroll sections connecting the outer end portions of alternating pairs of said elements and pipe sections connecting the inner end portions of the other pairs of said elements, said conduit being of substantially uniform cross sectional area throughout its extent.

11. A crystallizer apparatus comprising, in combination, a tank, a shaft extending longitudinally of said tank and means for rotating said shaft within said tank, a series of hollow heat interchanging elements secured to the said shaft and longitudinally and angularly spaced with relation to one another, each of said elements extending outwardly from the shaft toward and in proximity to the wall of said tank, a baffle in each of said heat interchanging elements for producing a circuitous passageway for the liquid flowing therethrough, and means for circulating liquid consecutively through the conduit comprising the passageways in the elements of said series from the element at one end of the series to and including the opposite end thereof, the said means comprising an inlet connection and an outlet connection with which each element is provided and communicating therewith on the opposite sides of the partition therein and a conduit section connecting the outlet connection of each element with the inlet connection of the next succeeding element of the series, and a conduit section communicating with the inlet connection of the first element in the series and a conduit section communicating with the outlet connection of the last element in the series, the said conduit being of substantially uniform cross-sectional area throughout its extent.

12. A crystallizer apparatus comprising, in combination, a tank, a shaft extending longitudinally of and within said tank and means for rotating said shaft, a series of hollow heat interchanging elements secured to the said shaft and longitudinally and angularly spaced with relation to one another, each of said elements comprising a substantially plane wall extending radially outwardly from the shaft, a second wall also extending radially outwardly from the said shaft and united at one edge thereof to the front edge of the former wall, a third wall united at its second edge to the opposite edge of the rear wall and extending outwardly from the shaft in a direction inclined toward the first mentioned wall and also converging at its front edge toward the front of the first mentioned wall, each of said elements having a baffle therein for reversing the flow of liquid therethrough in a radial direction and each being provided with inlet and outlet connections for liquid arranged on opposite sides of the baffle therein, and conduit means connecting the outlet connections of the elements in the series with the inlet connections of the elements successively adjacent thereto.

13. In the crystallizer apparatus set forth in claim 12, the inlet and outlet connections for each element being located in the outer end thereof, and hollow scroll sections connecting the outlets of the elements in the series with the inlets of the elements successively adjacent thereto, the outer edges of the said hollow scroll sections being located in proximity to the inner wall of the tank.

14. A crystallizer apparatus comprising, in combination, a tank, a shaft extending longitudinally of and within said tank and means for rotating said shaft, a series of hollow heat interchanging elements secured to the said shaft and longitudinally and angularly spaced with relation to one another, each of said elements comprising two walls which extend radially outwardly from the shaft toward and in proximity to the outer wall of the tank, one of said walls converging radially outwardly from the shaft toward the other wall as well as converging from the rear to the front thereof toward said other wall, each of the said elements being provided with an inlet connection and an outlet connection for circulating liquid therethrough, and a conduit connecting the outlet connections of the elements in the series with the inlet connections of the elements successively adjacent thereto.

15. In the crystallizer apparatus set forth in claim 14, each of the hollow heat-interchanging elements being of paddle-like form.

16. A crystallizer apparatus comprising, in combination, a tank, a shaft extending longitudinally of and within said tank and means for rotating said shaft, a series of hollow heat interchanging elements secured to the said shaft and longitudinally and angularly spaced with relation to one another, each of said elements comprising two walls which extend radially outwardly from the shaft toward and in proximity to the outer wall of the tank, one of said walls converging radially outwardly from the shaft toward the other wall as well as converging from the rear to the front thereof toward said other wall, each of the said elements being substantially wedge-shaped throughout at least the outer portion thereof, and each of the said elements being provided with connections for circulating liquid therethrough.

17. In the apparatus set forth in claim 14, a scroll connecting the outer ends of all of said elements with its outer edge portion in proximity to the inner wall of the tank.

18. In the apparatus recited in claim 14, the conduit comprising a hollow scroll section connecting the outlet connection of each element in the series with the inlet connection of the element immediately succeeding the same in the said series, the inlet and outlet connections of each element being located at the outer end thereof and the outer edge of each scroll section being in proximity to the inner wall of the tank.

19. In the crystallizer apparatus recited in claim 8, the conduit means comprising a pipe connected with the inlet connection of the first element of the series and a pipe connected with the outlet connection of the last element in the series, and pipes connecting the outlet connection of the first element with the inlet connection of the next element in the series and also connecting in like manner the outlet connection of each intermediate element of the series with the inlet connection of the next succeeding element and the outlet connection of the final intermediate element of the series with the inlet connection of the final element of the series.

HENRY H. FELDSTEIN.